US007297872B2

(12) United States Patent
Morijiri

(10) Patent No.: US 7,297,872 B2

(45) Date of Patent: Nov. 20, 2007

(54) FLAT CABLE

(75) Inventor: Daisuke Morijiri, Ibaraki (JP)

(73) Assignee: Junkosha Inc., Ibaraki-ken (JP)

( * ) Notice: Subject to any disclaimer, the term of this patent is extended or adjusted under 35 U.S.C. 154(b) by 0 days.

(21) Appl. No.: 11/334,801

(22) Filed: Jan. 17, 2006

(65) Prior Publication Data

US 2006/0157267 A1 Jul. 20, 2006

(30) Foreign Application Priority Data

Jan. 17, 2005 (JP) ............................ 2005-009019
Mar. 31, 2005 (JP) ............................ 2005-101774

(51) Int. Cl.
*H02G 15/08* (2006.01)

(52) U.S. Cl. ................ 174/88 C; 174/74 R; 174/75 C; 174/117 F; 174/117 FF

(58) Field of Classification Search .................. 174/36, 174/110 R, 113 R, 117 R, 117 F, 117 FF
See application file for complete search history.

(56) References Cited

U.S. PATENT DOCUMENTS

| | | | | |
|---|---|---|---|---|
| 3,775,552 | A * | 11/1973 | Schumacher | 174/105 R |
| 4,567,321 | A * | 1/1986 | Harayama | 174/117 F |
| 4,767,891 | A * | 8/1988 | Biegon et al. | 174/34 |
| 5,245,134 | A * | 9/1993 | Vana et al. | 174/117 F |
| 5,276,759 | A * | 1/1994 | Nguyen et al. | 385/114 |
| 5,306,869 | A * | 4/1994 | Springer et al. | 174/36 |
| 5,327,513 | A * | 7/1994 | Nguyen et al. | 385/114 |
| 5,463,186 | A * | 10/1995 | Schricker | 174/36 |
| 5,885,710 | A * | 3/1999 | MacDonald et al. | 428/375 |
| 6,834,147 | B2 * | 12/2004 | Rabate et al. | 385/114 |
| 2001/0022234 | A1 * | 9/2001 | Okumura et al. | 174/78 |
| 2003/0111255 | A1 * | 6/2003 | Buck et al. | 174/113 R |

FOREIGN PATENT DOCUMENTS

| | | | | |
|---|---|---|---|---|
| JP | 56-149712 | A | | 11/1981 |
| JP | 05-182528 | A | * | 7/1993 |
| JP | 5-182528 | A | | 7/1993 |
| JP | 11-251767 | A | | 9/1999 |
| JP | 2000-277226 | A | | 10/2000 |
| JP | 2000-322943 | A | | 11/2000 |
| JP | 2001-256839 | A | | 9/2001 |
| JP | 2004-27333 | A | | 9/2004 |
| JP | 2004-335279 | A | * | 11/2004 |
| JP | 2005-26022 | A | | 1/2005 |

* cited by examiner

*Primary Examiner*—William H. Mayo, III
(74) *Attorney, Agent, or Firm*—Allan M. Wheatcraft

(57) ABSTRACT

Flat cables having an external diameter of coaxial cables of 0.15 to 0.35 μm, at least a portion of the outer circumference of each coaxial cable fastened to a laminated sheet composed of a porous polytetrafluoroethylene. The flat cables are constructed so that these flat cables can pass via a through-hole with an internal diameter of 2.0 to 5.5 mm.

3 Claims, 6 Drawing Sheets

FLAT CABLE

FIELD OF THE INVENTION

The present invention relates to a flat cable in which a plurality of extremely fine coaxial cables used for high-speed transmission are disposed parallel to each other.

BACKGROUND OF THE INVENTION

Coaxial cables in which a core conductor is covered by a dielectric, the outer circumference of this dielectric is covered by a shielding layer composed of a conductor, and the outer circumference of this shielding layer is covered by an outer covering (jacket), are generally known, and are widely used as high-frequency transmission lines. In recent years, such coaxial cables have become increasingly fine; for example, extremely fine coaxial cables in which the diameter of the core conductor is 0.1 mm or less, and the external diameter of the coaxial cable is approximately 0.35 mm, have begun to be used in electronic devices such as compact notebook type personal computers, portable telephones and the like.

In such electronic devices, for example, a plurality of coaxial cables are used to establish electrical connections between the liquid crystal display part and main body part of a notebook type personal computer via a hinge with a small diameter, and such wiring and connections become complicated. Flat cables which are constructed by holding a plurality of coaxial cables parallel to each other in the same plane have been used as a means of establishing such complicated connections easily and securely. For instance, one example of such a flat cable is described in JP Patent Application No. 2004-27333. However, in the flat cable of this application, accurate maintenance of the pitch interval that is formed between the coaxial cables of the flat cable when the terminal treatment of the cable is performed after the flat cable is passed through a small-diameter hinge is difficult, and the terminal treatment is problematical.

Furthermore, there are cases in which braided cables that are braided using a plurality of coaxial cables are used, for example, in the electrical connections between the liquid crystal display part and main body part in portable telephones and the like. Here, however, as was described above, accurate maintenance of the pitch interval that is formed between the cables when the terminal treatment of the cable is performed after the cable is passed through a small-diameter hinge is difficult, and the terminal treatment is problematical.

In portable telephones (hereafter referred to as "terminal devices"), progress has been made in reduction of the size and weight of such terminal devices, and in the increased functionality of such devices, and there is therefore a demand for complicated wiring and connections in spite of the limited space inside such terminal devices. Furthermore, in regard to the configuration of such terminal devices, in addition to the so-called folding type configuration in which a movable part on which a liquid crystal display part is formed opens and closes by pivoting about the main body part, terminal devices with a new configuration in which the movable part is attached to the main body part so that this movable part can rotate in addition to folding have appeared on the scene in recent years.

In the abovementioned folding type and rotary type terminal devices, the movable part and main body part are connected via a cylindrical hinge that has a small diameter, and the liquid crystal display part and main body part are electrically connected by passing the abovementioned flat cable or braided cable through the hinge hole of the abovementioned hinge. Thus, flat cables or braided cables have come to be used in terminal devices; however, in the case of the flat cable or braided cable described in JP Patent Application No. 2004-27333, the cable is subjected to cable terminal working that accurately maintains the pitch interval between the coaxial cables in the flat cable or braided cable at a fixed value before the cable is passed through the hinge, e.g., a terminal treatment in which the respective coaxial cables are connected to the terminals of a connector or to an FPC (flexible printed circuit). If this is not done, accurate maintenance of the pitch interval after the cable has been passed through the hinge becomes difficult when the liquid crystal display part and main body part are electrically connected via the abovementioned cylindrical hinge that has a small diameter. On the other hand, if a terminal treatment is performed before the cable is passed through the hinge in order to ensure accurate maintenance of the pitch interval, the diameter of the terminal treatment part is increased, so that it becomes impossible to pass the cable through the hinge. However, it may be predicted that there will be a further diversification of terminal device configurations into various configurations in the future. On the one hand, taking into account the fact that there will be further progress in the reduction in size and weight of terminal devices, and the increased functionality of such terminal devices, the appearance of flat cables that allow the easy and secure accomplishment of complicated and difficult electrical connections, and flat cables that can ensure a uniform pitch between the coaxial cables, is to be hoped for.

The present invention was devised in light of the various problems described above; it is an object of the present invention to provide a flat cable which is superior in terms of softness and flexibility, which can be passed through an extremely narrow through-hole, which can favorably maintain the precision of the pitch between the coaxial cables, and which allows the easy and secure accomplishment of complicated and difficult electrical connections.

SUMMARY OF THE INVENTION

In order to achieve the abovementioned object, the flat cable according to the invention is a flat cable which is constructed by laying a plurality of coaxial cables side by side parallel to each other, characterized in that the external diameter of the abovementioned coaxial cables is 0.15 to 0.35 mm, at least a portion of the outer circumference of each of these coaxial cables is fastened to a laminated sheet composed of a porous polytetrafluoroethylene that has a fused layer, and the cable is constructed so that this cable can pass via a through-hole with an internal diameter of 2.0 to 5.5 mm.

As a result, in the flat cable according to the invention, since a plurality of coaxial cables are fastened to a laminated sheet composed of a porous polytetrafluoroethylene that has a fused layer, the flat cable is superior in terms of softness and flexibility, and the flat cable can be passed through even an extremely small through-hole by folding or rolling up the flat cable in the direction of length, while favorably maintaining the precision of the pitch between the coaxial cables, so that complicated and difficult electrical connections can be easily and securely accomplished. Consequently, the flat cable of the present invention can be passed through the hinge hole of a portable telephone, and can therefore be used for the electrical connections of portable telephones.

Furthermore, in addition to the features described above, the flat cable according to another embodiment of the invention is characterized in that the cable has at least 20 of the abovementioned coaxial cables. As a result, the flat cable according to this embodiment of the invention can be passed through an extremely small through-hole while favorably maintaining the precision of the pitch between the coaxial cables, by folding or rolling up the flat cable, so that this flat cable can handle even electronic devices that require a higher degree of complicated wiring and connections.

Furthermore, in addition to the features described above, the flat cable according to another embodiment of the invention is characterized in that the thickness of the abovementioned laminated sheet is 30 to 150 μm. Accordingly, the flat cable according to this embodiment of the invention is superior in terms of softness and flexibility, and can also be constructed so as to show favorable results in terms of durability.

Furthermore, the flat cable according to another embodiment of the invention is further characterized in that the abovementioned fused layer is composed of a tetrafluoroethylene/hexafluoropropylene copolymer. As a result, in the flat cable according to this embodiment of the invention, the abovementioned coaxial cables can be fastened to the abovementioned laminated sheet by thermal fusion; furthermore, by performing laser working on portions of the abovementioned laminated sheet following fusion fastening, it is possible to strip these portions.

DETAILED DESCRIPTION OF THE INVENTION

An embodiment of the flat cable of the present invention will be described below. Furthermore, the embodiment described below does not limit the invention described in the Claims; moreover, the characteristic combinations described in the embodiment are not necessarily essential in the solution means provided by the present invention.

First, a typical embodiment of the present invention will be described with reference to FIGS. 1 through 3. FIG. 1 is a diagram which respectively shows the coaxial cables 10 and laminated sheet 50 constituting the flat cable of the present invention. FIG. 2 is a sectional view showing flat cables 101 and 102 of the present invention. FIG. 3 is a sectional view respectively showing the flat cable in a folded state and rolled-up state.

Figure 1A:
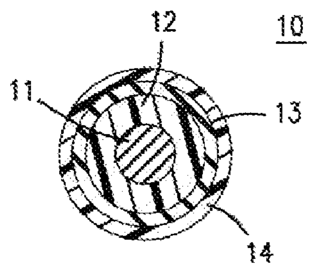
FIG. 1 is a diagram respectively showing the coaxial cables 10 and laminated sheet 50 constituting the flat cable of the present invention.
Figure 1B:
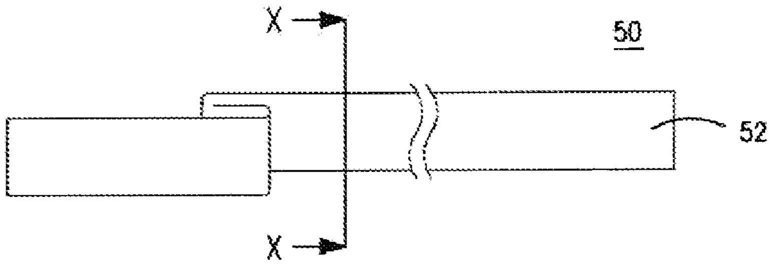
Figure 1C:
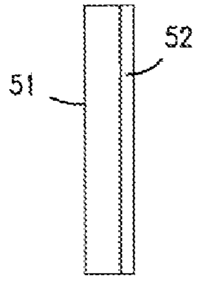
Figure 2A:
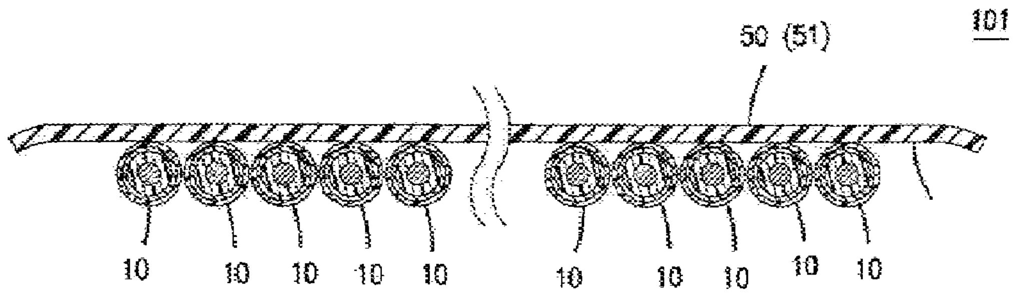
FIG. 2 shows sectional views illustrating the flat cables 101 and 102 of the present invention.
Figure 2B:
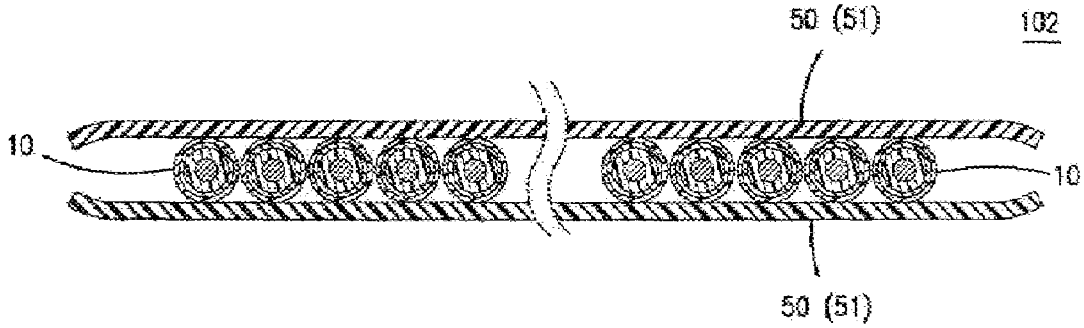

As is shown in FIGS. 2(A) and 2(B), the flat cables 101 and 102 of the present invention are constructed by fastening a plurality of extremely fine coaxial cables disposed side by side parallel to each other at equal intervals using one or more laminated sheets 50. First, the coaxial cables 10 and laminated sheet 50 that constitute the flat cables 101 and 102 of the present invention will be described with reference to FIG. 1.

FIG. 1(A) is a sectional view showing a cross section (a section perpendicular to the axial direction, where the axial direction is the direction of extension of the coaxial cables 10) of the coaxial cables 10. The coaxial cables 10 are constructed as follows: namely, a dielectric layer 12 composed of an insulating material is formed on the circumference of a core conductor 11 which is constructed by twisting together a plurality of conductors (e.g., seven conductors) (with a diameter of, for example, approximately 20 μm), and a plurality of conductors are laterally wrapped around the outer circumference of this dielectric layer 12 so that a shielding layer 13 is formed. Then, an outer covering 14 composed of an insulating material is formed on the outer circumference of the shielding layer 13. These coaxial cables 10 are cables that can be used to connect the liquid crystal display part and main body part of the abovementioned portable telephone; for example, the external diameter of the coaxial cables 10 is extremely small, i.e., approximately 0.15 to 0.3 mm. Furthermore, in the present embodiment, a tetrafluoroethylene/perfluoroalkyl vinyl ether copolymer (hereafter referred to as "PFA") is used as the material of the dielectric layer 12 and outer covering 14.

FIG. 1(B) is a perspective view showing the laminated sheet 50, and FIG. 1(C) is a sectional view of the same (a view in the direction indicated by the arrows along the line X-X in FIG. 1(B)). As is shown in FIG. 1(C), the laminated sheet 50 has a two-layer structure composed of a base layer 51 and a fused layer 52. The base layer 51 is an ultra-thin sheet formed by working a porous polytetrafluoroethylene (hereafter referred to as "EPTFE") into a band form with a thickness of 30 to 100 μm. The EPTFE can be obtained by drawing a raw-material polytetrafluoroethylene (hereafter referred to as "PTFE"), and is a fluororesin with a very fine continuously porous structure. This EPTFE is superior in terms of heat resistance, chemical resistance, weather resistance and the like; furthermore, this material is superior in terms of durability even when worked into an ultra-thin sheet with a thickness of 30 to 100 μm, and also shows abundant softness and extremely good flexibility.

The fused layer 52 is formed on the side of the base layer 51 to which the coaxial cables 10 are fastened, and is a fused layer with a thickness of approximately 10 to 50 μm composed of a tetrafluoroethylene/hexafluoropropylene copolymer (hereafter referred to as "FEP"). The fused layer 52 composed of this FEP can easily fasten the outer covering 14 composed of the abovementioned PFA (coaxial cables 10) and the base layer 51 composed of the abovementioned EPTFE (laminated sheet 50) by thermal fusion. Furthermore, as a result of this fastening by thermal fusion, a portion of the laminated sheet 50 can be stripped by laser working following such fastening by thermal fusion.

The flat cable 101 of the present invention shown in FIG. 2(A) is a flat cable in which a plurality of the abovementioned coaxial cables 10 are disposed side by side parallel to each other so that the spacing between the coaxial cables 10 (hereafter referred to as the "cable pitch") is, for example, 0.4 mm, the laminated sheet 50 is disposed on the upper parts of the coaxial cables 10, . . . , 10 from above so that the fused layer 52 is on the side of the coaxial cables 10, and the coaxial cables 10, . . . , 10 are fastened to the fused layer 52 by fusion.

The flat cable 102 shown in FIG. 2(B) is a flat cable in which the abovementioned flat cable 101 is also fastened by fusion by means of a laminated sheet 50 from the undersides of the coaxial cables 10, . . . , 10. Specifically, the flat cable 102 has a two-sided laminated structure in which the coaxial cables 10, . . . , 10 are clamped by two laminated sheets 50, 50 (in contrast, the structure of the flat cable 101 is called a "single-sided laminated structure").

Thus, the flat cable of the present invention may have either a two-sided laminated structure in which a plurality of coaxial cables 10 are clamped from both sides, or a single-sided laminated structure in which a laminated sheet is installed on only one side. The structure that is adopted can be arbitrarily selected in accordance with the intended use of the flat cable.

Furthermore, in the flat cables 101 and 102 of the present embodiment, there are no particular restrictions on the number of coaxial cables 10 that are fastened by means of the laminated sheet(s) 50. For example, in a portable telephone, a flat cable composed of approximately 20 to 50 coaxial cables is used; however, the number of coaxial cables may also be approximately 500 to 600. Furthermore, the cable pitch is likewise not restricted to 0.4 mm; this pitch can be set at a preferred cable pitch in accordance with the intended use of the flat cable and the like.

Figure 3A:
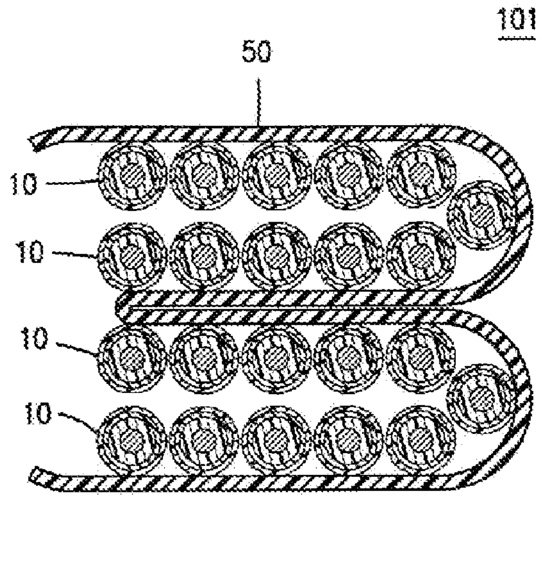
FIG. 3 shows sectional views respectively illustrating the flat cable in a folded state and a rolled-up state.
Figure 3B:
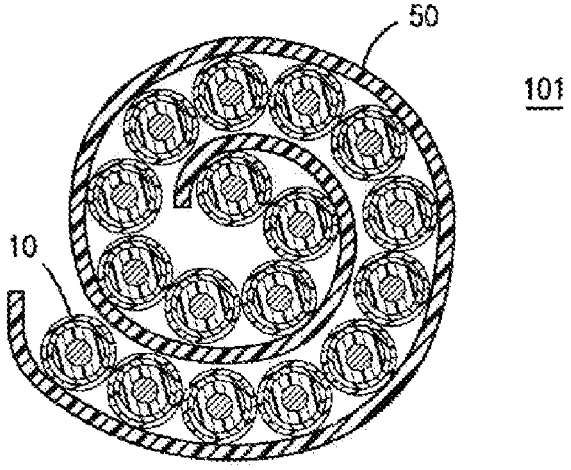

As was described above, in the flat cables 101 and 102 of the present embodiment, extremely fine coaxial cables with an external diameter of approximately 0.2 to 0.3 mm are disposed side by side parallel to each other in the same plane, and are fastened by thermal fusion to one or more laminated sheets 50 composed of EPTFE. Accordingly, in the flat cables 101 and 102, a specified cable pitch can be maintained with no disturbance of the respective coaxial cables 10, while maintaining a good flexibility. Especially in the case of the flat cable 101 which has a one-sided laminated structure, there is a high degree of freedom in the configurability of the cable, so that the flat cable 101 can easily be folded in the axial direction as shown in FIG. 3(A), or so that the flat cable 101 can easily be rolled up in the axial direction as shown in FIG. 3(B). Furthermore, in the examples of the flat cable 101 shown in FIGS. 3(A) and 3(B), the cables are in a state which is such that the laminated sheet(s) 50 envelop the plurality of coaxial cables 10 in order to hold the plurality of fastened coaxial cables 10 and prevent the respective coaxial cables 10 from becoming disordered. Thus, for example, the folded flat cable 101 or rolled-up flat cable 101 can be passed through the hinge hole 8*a* (through-hole) formed in the hinge 80 (see FIG. 6(A)).

Meanwhile, in the case of the abovementioned folding type or rotary type portable telephones, a hinge is used in which a hinge hole (through-hole) that has an internal diameter of approximately 3.0 to 5.5 mm and a depth of approximately 5 to 20 mm is formed. Especially in recent years, hinges have been used in which hinge holes with an internal diameter of approximately 3.0 to 4.0 mm and a depth of approximately 5 to 20 mm are formed. Furthermore, it may be predicted that the internal diameter will be reduced even further to a diameter of approximately 2.0 to 3.0 mm. As was described above, various problems arise when a conventional flat cable is passed through such a small hinge hole, so that such a passage is difficult. However, the present invention makes it possible to provide a flat cable whose configuration can easily be varied while maintaining a good flexibility by disposing extremely fine coaxial cables 10 side by side parallel to each other, and fastening these coaxial cables by thermal fusion using laminated sheet(s) 50 composed of EPTFE. As a result, the flat cable of the present invention can be passed through even the extremely small through-holes formed in the hinges used in rotary type portable telephones and the like. Accordingly, the flat cable of the present invention can also be used in rotary type portable telephones.

Figure 4A:
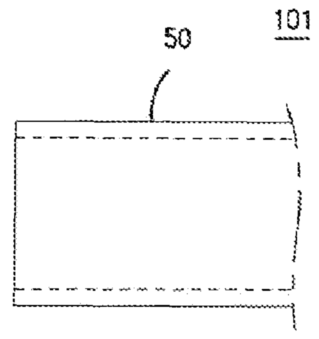
FIG. 4 shows plan views illustrating examples of the terminal structure of one end of the flat cable 101.

Next, the terminal structure of the flat cable 101 of the present embodiment will be described. FIGS. 4 and 5 are plan views showing examples of the terminal structure at one end of the flat cable 101. FIG. 4(A) is a plan view (seen from the side of the laminated sheet 50) of a flat cable 101 on which no terminal working has been performed. A plurality of coaxial cables 10 are fastened parallel to each other by thermal fusion to the back side of the laminated sheet 50 shown in FIG. 4.

Figure 4B:
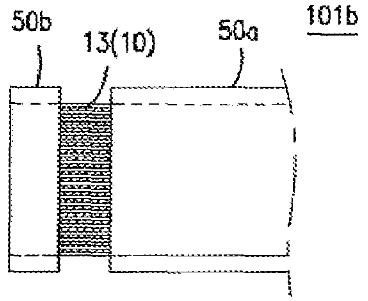

In the flat cable 101*b* shown in FIG. 4(B), a portion of the laminated sheet 50 is stripped by laser working so that a central laminated sheet 50*a* and an end-portion laminated sheet 50*b* are left, and the outer coverings 14 of the plurality of coaxial cables 10 fastened by means of the laminated sheets 50*a* and 50*b* are removed by laser working. As is shown in FIG. 4(B), the shielding layers 13 of the coaxial cables 10 whose outer coverings 14 have been removed are exposed.

Figure 4C:
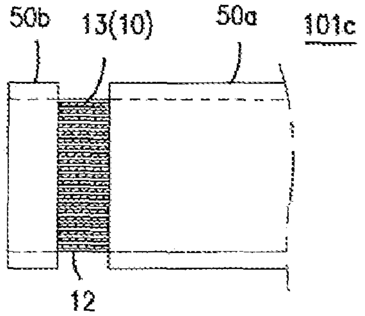

The flat cable 101*c* shown in FIG. 4(C) is a flat cable that is formed by subjecting the abovementioned flat cable 101*b* to a treatment that removes a portion of the shielding layer 13 so that the dielectric layer 12 of each coaxial cable 10 is exposed (hereafter referred to as "shielding cutting").

Thus, the use and function of the flat cable 101 of the present embodiment can be improved by performing various types of terminal treatments. In particular, in the flat cables 101*b* and 101*c*, since the end portion of the laminated sheet 50*b* holds the coaxial cables 10 in place, the precision of the pitch of the tip ends of the coaxial cables 10 can be maintained at a favorable level when the flat cable is passed through a hinge or the like. Furthermore, FIG. 5 shows examples of the terminal structure; the terminal structure of the flat cable of the present invention is not limited to these examples.

Next, the manner in which the flat cable 101 of the present embodiment can be used will be described with reference to FIGS. 5 and 6. FIG. 5 is a plan view showing an example of the manner in which the flat cable 101*c* can be used. FIG. 6 is a plan view showing a state in which the flat cable 101*c*1 is passed through a hinge 80.

Figure 5A:
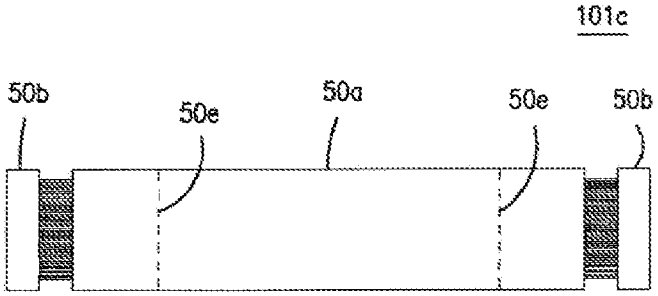
FIG. 5 shows plan views illustrating examples of the manner in which the flat cable 101*c* can be used.
Figure 5B:
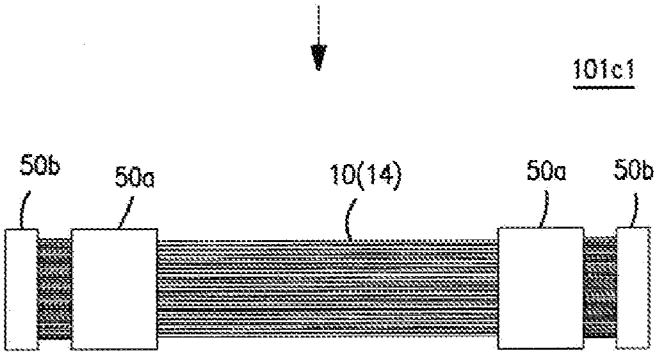
Figure 5C:
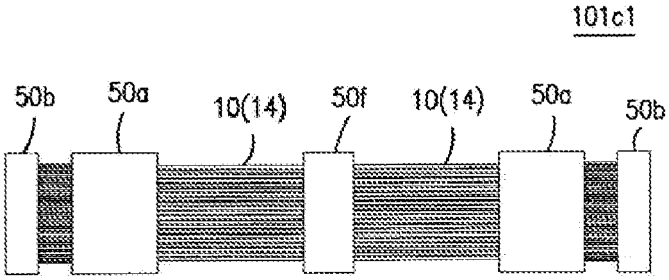

As is shown in FIG. 5(A), a cut is formed by laser working in an arbitrary position of the laminated sheet 50*a* that remains in the center of the flat cable 101*c*, and this flat cable can be used with a portion of the laminated sheet 50*a* stripped away along this cut (see FIG. 5(B)). In this case, as is shown in FIG. 5(C), a band-form laminated sheet 50*f* may be left in an arbitrary position.

Figure 6A:
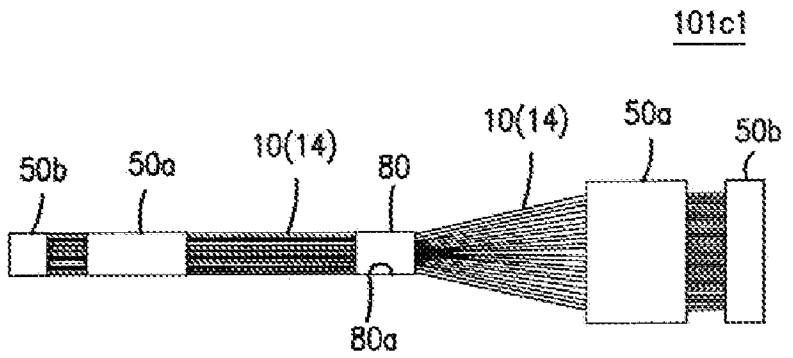
FIG. 6 shows plan views illustrating a state in which the flat cable 101*c*1 is passed through a hinge 80.
Figure 6B:
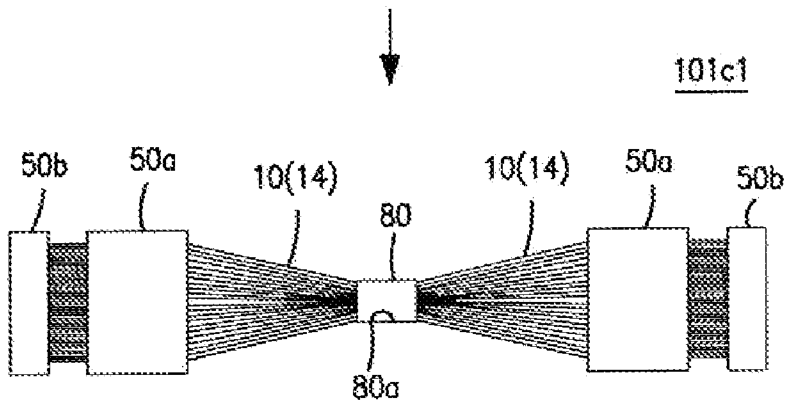

FIG. 6(A) shows a state in which one end of the flat cable 101*c*1 is passed via a through-hole 80*a* formed in the hinge 80, with this flat cable in a folded or rolled-up state. As was described above, the laminated sheet 50 is formed from EPTFE, and is therefore superior in terms of softness and flexibility. Accordingly, the tip end of the flat cable 101*c*1 can be passed through even a small through-hole 80*a* formed in the hinge or the like of a terminal device, by folding or rolling up this tip end of the flat cable 101*c*1. After the tip end of the flat cable 101*c*1 has been passed through this hinge 80, the tip end of the flat cable may again be spread out as shown in FIG. 6(B). Since the coaxial cables 10 are fastened by means of the laminated sheet 50*b* in the end part of the flat cable 101*c*1 as described above, the connection of the flat cable 101*c*1 is easy and secure; furthermore, the precision of the pitch of the coaxial cables 10 can be favorably maintained.

Next, working examples of the present invention will be described. A hinge passage test was performed using the flat cables 105, 106, 107, 108 and 109 of Working Examples 1 through 5 described below.

WORKING EXAMPLE 1

Flat Cable 105

A dielectric layer composed of PFA with a thickness of approximately 40 μm was formed on the outer circumference of a core conductor formed by twisting together seven conductors having a diameter of 25 μm, and a laterally wrapped shielding layer used as an external conductor layer was formed by wrapping a conductor wire with a diameter of 30 μm around the outer circumference of this dielectric layer. An outer covering with a thickness of approximately 30 μm was formed on the outer circumference of this external conductor layer, and 40 extremely fine coaxial cables with an external diameter of 0.28 mm were fastened on one side only by a laminated sheet with a thickness of 80 μm formed from EPTFE so that the cable pitch was 0.4 mm, thus producing a flat cable 105.

WORKING EXAMPLE 2

Flat Cable 106

A dielectric layer composed of PFA with a thickness of approximately 35 μm was formed on the outer circumference of a core conductor formed by twisting together seven conductors having a diameter of 25 μm, and a laterally wrapped shielding layer used as an external conductor layer was formed by wrapping a conductor wire with a diameter of 30 μm around the outer circumferential of this dielectric layer. An outer covering with a thickness of approximately 30 μm was formed on the outer circumference of this external conductor layer, and 40 extremely fine coaxial cables with an external diameter of 0.24 mm were fastened on one side only by a laminated sheet with a thickness of 80 μm formed from EPTFE so that the cable pitch was 0.3 mm, thus producing a flat cable 106.

WORKING EXAMPLE 3

Flat Cable 107

A dielectric layer composed of PFA with a thickness of approximately 30 μm was formed on the outer circumference of a core conductor formed by twisting together seven conductors having a diameter of 16 μm, and a laterally wrapped shielding layer used as an external conductor layer was formed by wrapping a conductor wire with a diameter of 20 μm around the outer circumferential of this dielectric layer. An outer covering with a thickness of approximately 20 μm was formed on the outer circumference of this external conductor layer, and 40 extremely fine coaxial cables with an external diameter of 0.19 mm were fastened on one side only by a laminated sheet with a thickness of 80 μm formed from EPTFE so that the cable pitch was 0.3 mm, thus producing a flat cable 107.

Each of the abovementioned flat cables 105, 106 and 107 was successfully passed through a hinge having a through-hole with an internal diameter of 3.0 mm and a depth of 20 mm, without causing any damage to the flat cables, and with the precision of the pitch between the coaxial cables of the flat cables maintained at a favorable level.

WORKING EXAMPLE 4

Flat Cable 108

A dielectric layer composed of PFA with a thickness of approximately 25 μm was formed on the outer circumference of a core conductor composed of a conductor (single wire) having a diameter of 25 μm, and a laterally wrapped shielding layer used as an external conductor layer was formed by wrapping a conductor wire with a diameter of 20 μm around the outer circumferential of this dielectric layer. An outer covering with a thickness of approximately 20 μm was formed on the outer circumference of this external conductor layer, and 620 extremely fine coaxial cables with an external diameter of 0.155 mm were fastened on one side only by a laminated sheet with a thickness of 35 μm formed from EPTFE so that the cable pitch was 0.2 mm, thus producing a flat cable 108.

This flat cable 108 was successfully passed through a hinge having a through-hole with an internal diameter of 5.5 mm and a depth of 20 mm, without causing any damage to the flat cable 108, and with the precision of the pitch between the coaxial cables of the flat cable maintained at a favorable level.

WORKING EXAMPLE 5

Flat Cable 109

A dielectric layer composed of PFA with a thickness of approximately 52.5 μm was formed on the outer circumference of a core conductor formed by twisting together seven conductors having a diameter of 20 μm, and a laterally wrapped shielding layer used as an external conductor layer was formed by wrapping a conductor wire with a diameter of 30 μm around the outer circumferential of this dielectric layer. An outer covering with a thickness of approximately 35 μm was formed on the outer circumference of this external conductor layer, and 20 extremely fine coaxial cables with an external diameter of 0.31 mm were fastened on one side only by a laminated sheet with a thickness of 35 μm formed from EPTFE so that the cable pitch was 0.4 mm, thus producing a flat cable 109.

This flat cable 109 was successfully passed through a hinge having a through-hole with an internal diameter of 2.0 mm and a depth of 20 mm, without causing any damage to the flat cable 109, and with the precision of the pitch between the coaxial cables of the flat cable maintained at a favorable level.

An embodiment and working examples of the present invention were described above. The flat cables 101 and 102 of the present invention are flat cables constructed by laying a plurality of coaxial cables 10 side by side parallel to each other, characterized in that the external diameter of these coaxial cables is 0.15 to 0.35 mm, at least a portion of the outer circumference (outer covering 14) of each of these coaxial cables 10 is fastened to a laminated sheet 50 composed of a porous polytetrafluoroethylene (EPTFE), and the cable is constructed so that this cable can pass via a through-hole with an internal diameter of 2.0 to 5.5 mm.

As a result, in the flat cables 101 and 102, since a plurality of coaxial cables 10 are fastened to a laminated sheet 50 composed of a porous polytetrafluoroethylene (EPTFE), these flat cables are superior in terms of softness and flexibility, and the flat cables 101 and 102 can be passed through even an extremely small through-hole by folding or rolling up the flat cables in the direction of length. Consequently, the flat cables 101 and 102 can be passed through the hinge hole of a portable telephone, so that these flat cables can be used for the connections of portable telephones. Furthermore, the precision of the pitch between the coaxial cables 10 can be maintained at a favorable level, so that complicated and difficult electrical connections can be easily and securely accomplished.

Furthermore, the flat cables 101 and 102 of the present invention are characterized in that these flat cables have at least 20 coaxial cables. As a result, these flat cables 101 and 102 can be passed through an extremely small through-hole, while maintaining the precision of the pitch between the coaxial cables at a favorable level, by folding or rolling up the flat cables, so that these flat cables can handle even electronic devices that require a higher degree of complicated wiring and connections.

Furthermore, the flat cables 101 and 102 of the present invention are characterized in that the thickness of the laminated sheet 50 is 30 to 150 μm. As a result, the flat cables 101 and 102 are superior in terms of softness and flexibility, and can also be constructed so as to show favorable results in terms of durability.

Furthermore, the flat cables 101 and 102 of the present invention are characterized in that the fused layer 52 is composed of a tetrafluoroethylene/hexafluoropropylene copolymer (FEP). As a result, in the flat cables 101 and 102, the coaxial cables 10 (outer coverings 14) can be fastened to the laminated sheet(s) 50 by thermal fusion; furthermore, portions of the laminated sheet 50 can be stripped by subjecting these portions to laser working following fastening by thermal fusion.

Furthermore, the scope of the present invention is not limited to the abovementioned embodiment and working examples, and the present invention can be used in various other embodiments. Also, the use and function of the flat cable of the present invention can be further improved by performing terminal working on this flat cable.

Besides being used in electronic devices such as portable telephones, personal computers and the like, the flat cable of the present invention can also be used in fields such as automotive engineering and the like.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A flat cable comprising a plurality of coaxial cables side by side parallel to each other, the external diameter of said coaxial cables is 0.15 to 0.30 mm;

at least a portion of an outer circumference of each of said coaxial cables having an outer covering of tetrafluoroethylene/perfluoroalkyl vinyl ether and being fastened to a laminated sheet comprising a porous polytetrafluoroethylene and a fused layer of tetrafluoroethylene/hexafluoropropylene; and said cable adapted to pass via a through-hole with an internal diameter of 2.0 to 5.5 mm.

2. The flat cable according to claim 1, wherein said flat cable has at least 20 of said coaxial cables.

3. The flat cable according to claim 1, wherein a thickness of said laminated sheet is 30 to 150 μm.

* * * * *